July 28, 1959

S. E. KIVELA 2,896,333

SIZING GAUGE FOR HARDWARE ITEMS

Filed April 9, 1957

Stanley E. Kivela
INVENTOR.

BY *(signatures)*
Attorneys

July 28, 1959
S. E. KIVELA
2,896,333
SIZING GAUGE FOR HARDWARE ITEMS
Filed April 9, 1957
2 Sheets-Sheet 2
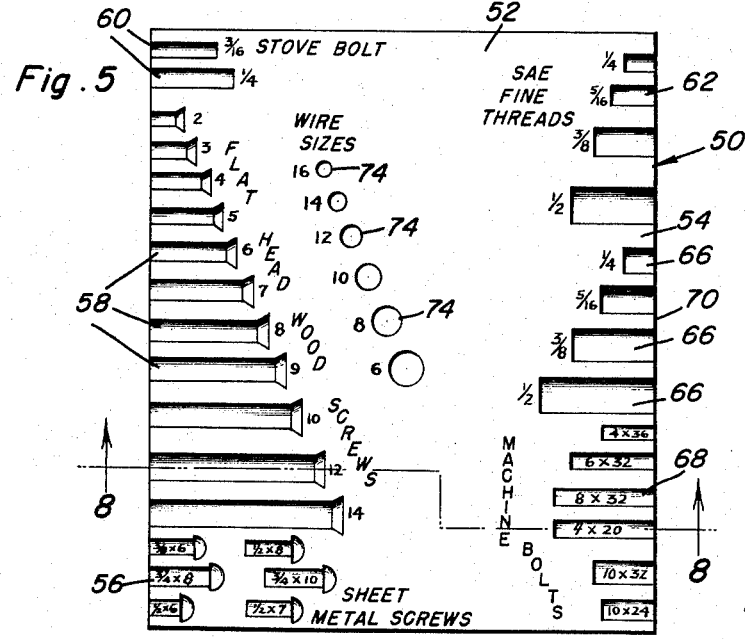
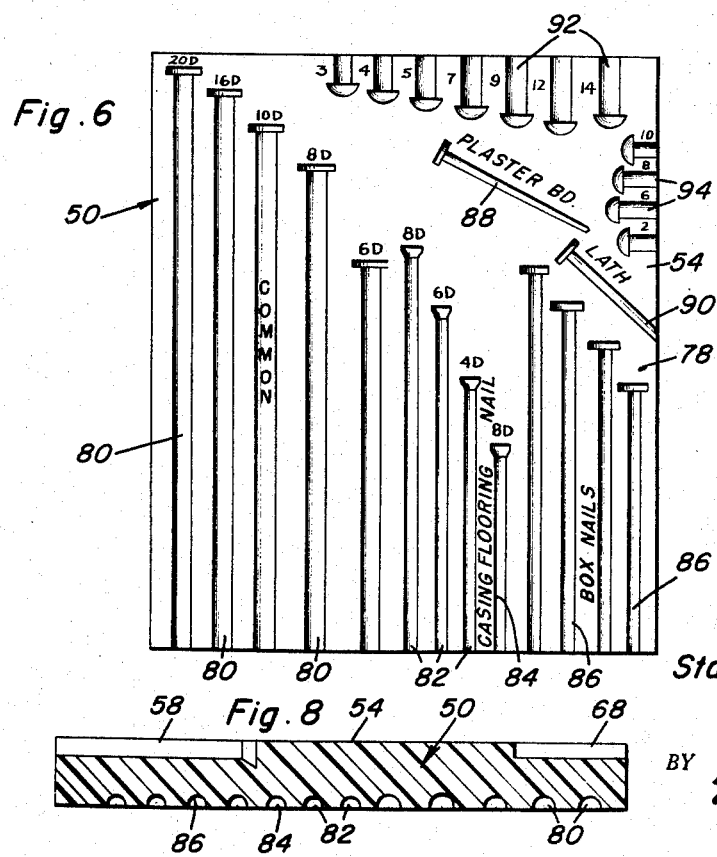
Stanley E. Kivela
INVENTOR.

United States Patent Office 2,896,333
Patented July 28, 1959

2,896,333

SIZING GAUGE FOR HARDWARE ITEMS

Stanley E. Kivela, Fond du Lac, Wis.

Application April 9, 1957, Serial No. 651,789

1 Claim. (Cl. 33—178)

This invention relates to gauges and more particularly to gauges which are useful in connection with the sizing or gauging of a plurality of items.

An object of this invention is to provide a gauge for householders, repairmen or others who may have need for a convenient gauge for the various sizes of plumbing repair items, pipe sizes, washers, bonnet packing, washers, etc., and also common hardware items, such as screws, nails, rivets, etc., so that they would be able to obtain replacements of the correct size by reference to these gauges.

Although gauges constructed in accordance with the invention are perfectly suited for the professional, they will find a considerably more valued application with the layman, plumber, carpenter, etc. A common experience for a householder is to go to a store and request a spigot washer without knowing the correct size. The salesman is faced with the problem of speculating as to the correct size or selling an assortment of washers. In most instances the purchaser wishes only a single washer and does not wish to buy an entire assortment which, for the large part, becomes useless in the possession of the householder.

Not only is such a situation common, but it is also time consuming for the salesman and embarrassing for the purchaser. With a gauge constructed in accordance with my invention, the amateur plumber, carpenter, etc., will be able to ask for the correct item by the exact name thereby communicating the information correctly and accurately to the salesman.

I am aware of prior gauges for a variety of items. However, my gauge differs from all others of which I have been made aware by having a much wider application in view of a greater variety of gauge openings. Moreover, I have not been made aware of any prior gauges which utilize a panel which has a number of outwardly opening depressions or recesses formed in the surfaces or edges thereof within which the correct size item is fitted for gauging purposes. Prior gauges have had holes, tongues, etc., but each is subject to criticism in comparison to my invention in that the sizing of items or parts by my gauge is much quicker, requiring no winding or threading and providing absolutely no likelihood of stripping the threads in the case of screws.

Other objects and features of importance, such as the practicability and simplicity of construction, will become apparent in following the description of the illustrated forms of the invention.

In the drawings:

Figure 5 is an elevational view of a gauge for miscellaneous hardware items that is also constructed in accordance with the invention;

Figure 6 is a plan view of the gauge in Figure 5 showing the opposite side thereof;

Figure 7 is an edge elevational view of the gauge in Figure 5, and

Figure 8 is a transverse sectional view taken on the line 8—8 of Figure 5.

Figure 1:
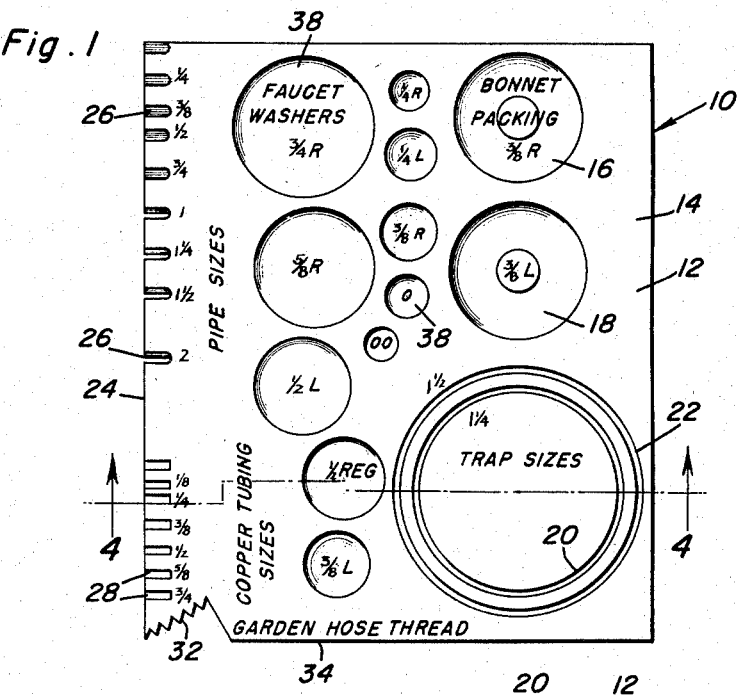
Figure 1 is a plan view of a plumbing items and parts gauge that is constructed in accordance with my invention.
Figure 3:
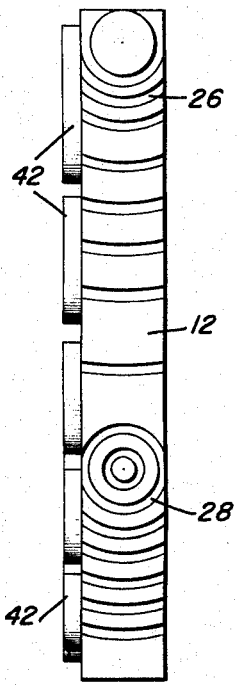
Figure 3 is an edge view of the gauge in Figure 1.
Figure 2:
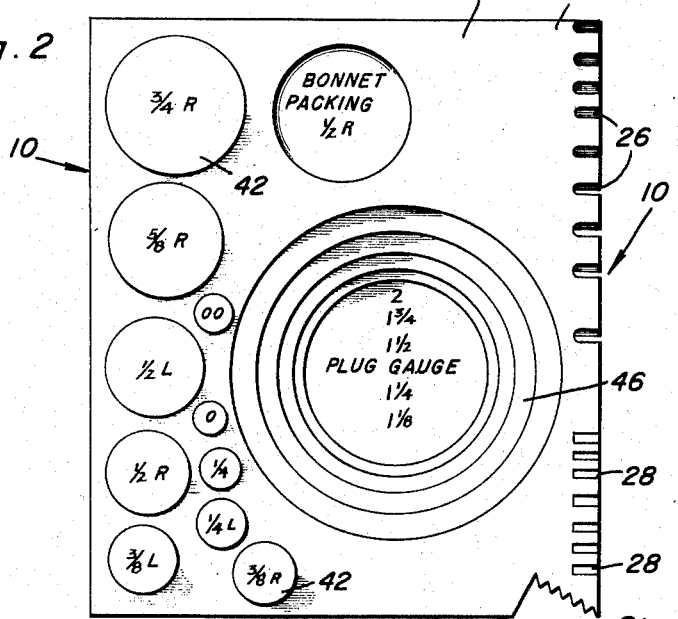
Figure 2 is a plan view of the gauge of Figure 1 showing the reverse side thereof.
Figure 4:
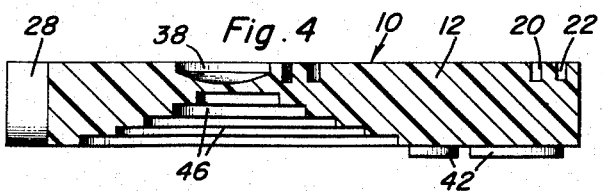
Figure 4 is a transverse sectional view taken on the line 4—4 of Figure 1.

Plumbing items and parts gauge 10 is illustrated in Figures 1–4. It consists of a panel 12 which may be of any material, for example plastic, the panel having means on both faces thereof and along at least two edges for gauging various common items. One surface 14 of panel 12 has a toroidal recess 16 therein by which to gauge a spigot, valve, etc. Bonnet packing of a particular size, for example ⅜" regular. A toroidal recess 18 is adjacent to recess 16 and is of a slightly different size to gauge a bonnet packing of a ⅜" large size. Trap size gauges 20 and 22 are formed in the surface 14 of panel 12 and consist of two grooves which are 1¼" and 1½" respectively.

One edge 24 of panel 12 is formed with nine arcuate fragments of circular grooves by which ¼", ⅜", ½", ¾", 1", 1¼", 1½" and 2" water pipe may be measured. A similar arrangement of arcuate groove fragments 28 are formed in the same edge of the panel 12 by which copper tubing sizes ranging from ⅛" to ¾" may be gauged. An arcuate fragment 32 of a garden hose thread is formed in the edge 34 of panel 12 by which garden hose couplings may be gauge. A group of ten faucet washer gauging recesses 38 are on surface 14 of panel 12 and they range in size from the smallest commercially available size to the largest. The old washer can be fitted into one of these depressions or recesess and the size noted. If the old washer is beyond measuring, the reverse side 40 of gauge 12 will be used since it has a group of projections or disks 42 which are circular and which range in size from the smallest to the largest commercially popular faucet washer size. The end of the faucet stem can be placed against one of these projections and the size noted whereby the prospective purchaser will be able to order the correct size washer. A plug gauge 46 is formed by a plurality of concentric recesses that are at different levels and which are of common plug sizes, usually ranging from 1⅛" to 2" in diameter.

Reference is now made to Figures 5–8, where there is gauge 50. One surface 52 of panel 54 from which gauge 50 is constructed, is formed with outwardly opening recesses 56 by which to gauge a plurality of sizes of sheet metal screws. The depressions or recesses for the sheet metal screws are each shaped like one-half of the screw that is, with one-half of the head and one-half of the shank when divided longitudinally of the screw. In this way the screw is simply rested in the recess and the size read from the indicia on the panel. A group 58 of recesses shaped for accommodating flat headed wood screws ranging from #2 to #14 size, is formed in the panel 54. Stove bolt shank receiving semi-cylindrical recesses 60 accept ¼" and ⁵⁄₁₆" stove bolts while the recesses 62 are for SAE fine threads ranging from ¼" to ½". A group 66 of semi-cylindrical recesses for U.S.S. threads gauge such bolts, while the machine bolt recess group 68 is adjacent thereto. These gauges would have the heads of the bolts abutting the edge 70 of panel 54 and the length measured by the gauge as well as the thread, inasmuch as the bolt gauges will be formed with the appropriate threads. A group of blind apertures or recesses 74 to gauge wire sizes, is formed in the surface 52 of panel 54, these sizes ranging from the more common smaller 16 gauge to #6 wire.

The opposite side or surface 78 of panel 54 has recesses which are shaped in the form of one-half of a nail, these gauges for the most part judging the length of the nail and also the head formation. Common nails have a group of recesses 80 for the gauging thereof, there being a range from sixpenny to twentypenny common nails with the recesses being semi-cylindrical and semi-cylindrical head accommodating enlargements at the inner ends thereof. Finishing nail gauging recesses 82 range from fourpenny to eightpenny sizes are in this same surface of panel 54. Casing nail recess with the appropriate size head accommodating enlargement at the inner end of the recess is located adjacent to the finishing nail recesses and near the group of recesses 86 which are shaped to accommodate box nails. Plasterboard nail accommodating recess 88 is formed in the panel 54 adjacent to the last nail accommodating recess 90 and also adjacent to the groups of recesses 92 and 94 for round head wood screws.

In the construction of gauges 10 and 50, where threads are on the parts that are to be gauged, the recesses will have proper threads to receive one-half the threaded part thereof, usually the shank. Where the items are headed, the head will fit exactly in the recesses provided especially for the heads, accommodating one-half of the same. Where length is important, the recesses are formed correct distances from the edges of the panel so that when the heads are seated in the head receiving recesses, the length measures to the edge of the panel. Appropriate indicia is copiously applied on all sides of the panel to inform the user of the item and size thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A gauge comprising the combination of a panel that has two surfaces and a plurality of edges, one surface of said panel having recesses opening therethrough and extending only partially through said panel to accept items that are to be sized along their outer edge for both dimension and shape, one edge of said panel having concentric arcuate grooves therein by which to size items that have an arcuate section and specific wall thickness, and projections rising from a part of said panel and on which to size the inside of the same or other items that have an arcuate section.

References Cited in the file of this patent
UNITED STATES PATENTS

| | | |
|---|---|---|
| D. 104,867 | McIntosh | June 8, 1937 |
| 1,881,651 | Judge | Oct. 11, 1932 |
| 2,728,145 | Holladay | Dec. 27, 1955 |

FOREIGN PATENTS

| | | |
|---|---|---|
| 11,769 | Switzerland | Mar. 11, 1896 |